(12) United States Patent
Yang et al.

(10) Patent No.: US 11,487,395 B2
(45) Date of Patent: Nov. 1, 2022

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Jin Bok Yang, Seoul (KR); Gun Young Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/230,176

(22) Filed: Apr. 14, 2021

(65) Prior Publication Data

US 2021/0333946 A1 Oct. 28, 2021

(30) Foreign Application Priority Data

Apr. 24, 2020 (KR) .......................... 10-2020-0050304

(51) Int. Cl.
*G06F 3/044* (2006.01)

(52) U.S. Cl.
CPC .......... *G06F 3/0446* (2019.05); *G06F 3/0443* (2019.05); *G06F 2203/04111* (2013.01)

(58) Field of Classification Search
CPC ................. G06F 3/0446; G06F 3/0412; G06F 2203/04112; G06F 3/04164; G06F 2203/04111; G06F 3/0416; G06F 3/042; G06F 3/0421; G06F 3/0443
See application file for complete search history.

(56) References Cited

U.S. PATENT DOCUMENTS

| 2019/0079622 A1* | 3/2019 | Choi ..................... G06F 3/0446 |
| 2020/0159369 A1* | 5/2020 | Seo ....................... G06F 3/0443 |
| 2020/0328257 A1* | 10/2020 | Kim .................... H01L 51/5056 |

FOREIGN PATENT DOCUMENTS

WO  2013/063176 A1  5/2013

* cited by examiner

*Primary Examiner* — Md Saiful A Siddiqui
(74) *Attorney, Agent, or Firm* — The PL Law Group, PLLC

(57) ABSTRACT

A touch sensor according to an embodiment of the present disclosure includes a substrate layer, sensing electrodes formed on the substrate layer, at least one device hole penetrating through at least one of the sensing electrodes, a barrier wall pattern formed along a periphery of the device hole, and an extension pattern disposed in the device hole to be connected to the barrier wall pattern. Defects caused by an external static electricity in the device hole can be prevented by the barrier wall pattern and the extension pattern.

15 Claims, 5 Drawing Sheets

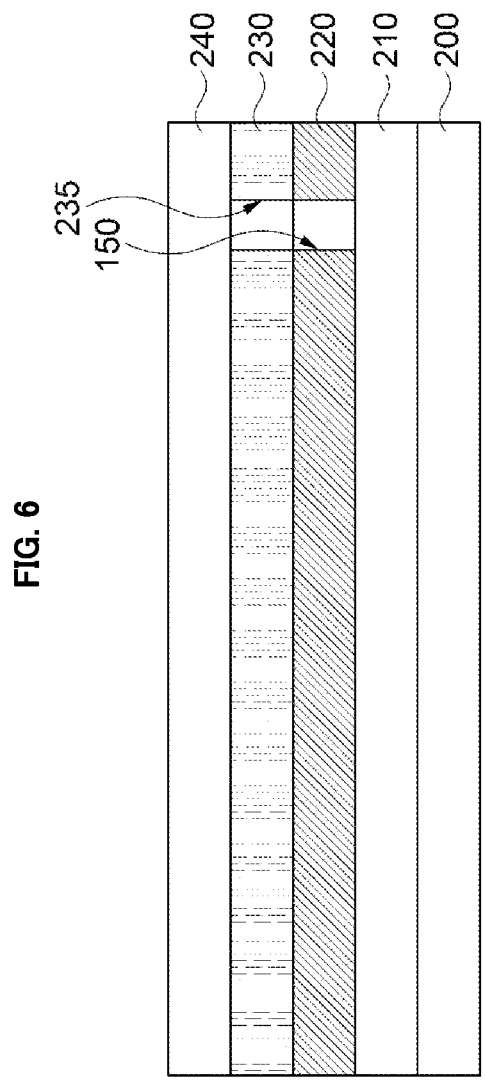

TOUCH SENSOR AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2020-0050304 filed on Apr. 24, 2020 in the Korean Intellectual Property Office (KIPO), the entire disclosure of which is incorporated by reference herein.

BACKGROUND

1. Field

The present invention relates to a touch sensor and an image display device including the same. More particularly, the present invention relates to a touch sensor including a patterned sensing electrode, and an image display device including the same.

2. Description of the Related Art

As information technologies are being developed, various demands in display devices having thinner dimension, lightweight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

The touch sensor may include a plurality of sensing electrodes for a touch sensing. If the touch sensor is disposed on a front surface of the display device, an image quality may be deteriorated by the sensing electrode. Thus, a touch sensor having high transmittance or high transparency is advantageous when being employed to the display device.

Further, as various additionally functional devices (e.g., a camera, a speaker, a recording device, an optical sensor, a light, etc.) are coupled to the display device, the desired function of the devices may be disturbed or degraded by the touch sensor.

When a device area is allocated to a partial area of the touch sensor for the combination of the functional devices, an operation of the touch sensor may be disturbed by an electrical disturbance in the device area.

Accordingly, the touch sensor having improved compatibility with the display device/functional devices while also having improved sensitivity is needed. For example, as disclosed in Korean Patent Application Publication No. 2014-0092366, an image display device combined with a touch screen panel including a touch sensor has been developed.

SUMMARY

According to an aspect of the present invention, there is provided a touch sensor having improved sensing reliability and device compatibility.

According to an aspect of the present invention, there is provided an image display device including the touch sensor.

The above aspects of the present inventive concepts will be achieved by the following features or constructions:

(1) A touch sensor, including: a substrate layer; sensing electrodes formed on the substrate layer; at least one device hole penetrating through at least one of the sensing electrodes; a barrier wall pattern formed along a periphery of the device hole; and an extension pattern disposed in the device hole to be connected to the barrier wall pattern.

(2) The touch sensor according to the above (1), wherein the sensing electrodes includes first sensing electrodes arranged in a first direction parallel to a top surface of the substrate layer; and second sensing electrodes arranged along a second direction parallel to the top surface of the substrate layer, the first direction and the second direction intersecting each other.

(3) The touch sensor according to the above (2), further including: connecting portions integrally formed with first sensing electrodes neighboring in the first direction of the first sensing electrodes to form first sensing electrode rows extending in the first direction; and bridge electrodes electrically connecting second sensing electrodes neighboring in the second direction of the second sensing electrodes to form second sensing electrode columns extending in the second direction.

(4) The touch sensor according to the above (3), wherein the device hole is formed in at least one of intersection regions of the first sensing electrode rows and the second sensing electrode columns.

(5) The touch sensor according to the above (4), wherein the device hole penetrates through a pair of first sensing electrodes adjacent to each other of the first sensing electrodes and a pair of second sensing electrodes adjacent to each other of the second sensing electrodes.

(6) The touch sensor according to the above (4), wherein the barrier wall pattern includes a first barrier wall pattern in contact with a first sensing electrode around the device hole of the first sensing electrodes, and a second barrier wall pattern in contact with a second sensing electrode around the device hole of the second sensing electrodes, wherein the extension pattern includes a first extension pattern connected to the first barrier wall pattern, and a second extension pattern connected to the second barrier wall pattern.

(7) The touch sensor according to the above (6), further including a first dummy pattern extending between the first barrier wall pattern and the second extension pattern or between the second barrier wall pattern and the first extension pattern.

(8) The touch sensor according to the above (7), further including: a first bridge pattern electrically connecting the first barrier wall pattern and the first extension pattern; and a second bridge pattern electrically connecting the second barrier wall pattern and the second extension pattern.

(9) The touch sensor according to the above (8), wherein the first bridge pattern and the second bridge pattern intersect the first dummy pattern in a planar view.

(10) The touch sensor according to the above (7), further including: a first connection pattern integrally connecting the first barrier wall pattern and the first extension pattern to each other at the same level; and a second connection pattern integrally connecting the second barrier wall pattern and the second extension pattern to each other at the same level.

(11) The touch sensor according to the above (10), wherein the first dummy pattern has a shape cut by the first connection pattern or the second connection pattern.

(12) The touch sensor according to the above (7), further including a second dummy pattern extending between the first extension pattern and the second extension pattern.

(13) The touch sensor according to the above (12), wherein the first extension pattern, the second extension pattern and the second dummy pattern are arranged along the same circumference.

(14) The touch sensor according to the above (1), wherein the sensing electrodes include a transparent conductive oxide, and the barrier wall pattern and the extension pattern include a metal or an alloy.

(15) A window stack structure, including: a window substrate; and the touch sensor according to embodiments as described above.

(16) The window stack structure according to the above (15), further including a polarizing plate disposed between the touch sensor and the window substrate or on the touch sensor.

(17) An image display device, including: a display structure including at least one functional device selected from the group consisting of a camera, a speaker, an optical sensor, a recorder and a light; and the touch sensor according to embodiments as described above stacked on the display structure.

(18) The image display device according to the above (17), wherein the device hole of the touch sensor is aligned to be superimposed over the functional device.

In a touch sensor according to exemplary embodiments as described above, a device hole may be formed through a sensing electrode. The device hole may be formed to correspond to functional devices such as, e.g., a camera, a speaker, an optical sensor, a recorder, a light, etc. of an image display device, so that operation and performance of the functional device may be substantially and completely implemented without being interfered by the touch sensor.

In exemplary embodiments, a wall pattern may be formed along a periphery of the device hole, and an extension pattern connected to the wall pattern may be formed at an inside of the device hole. A mobility of an external static electricity within the device hole may be promoted by the extension pattern. Accordingly, physical and electrical defects of sensing electrodes caused by the external static electricity may be prevented, and durability and stability of the touch sensor may be improved.

In some embodiments, dummy patterns may be arranged at the inside of the device hole to further promote the mobility of the external static electricity by the extension pattern, while preventing a charge flow and an electrical interference to the sensing electrode.

BRIEF DESCRIPTION OF THE DRAWINGS

FIG. 6 is a schematic cross-sectional view illustrating an image display device in accordance with exemplary embodiments.

DETAILED DESCRIPTION OF THE EMBODIMENTS

According to exemplary embodiments of the present invention, there is provided a touch sensor including a plurality of sensing electrodes and at least on device hole. Further, a window stack structure and an image display device including the touch sensor are also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
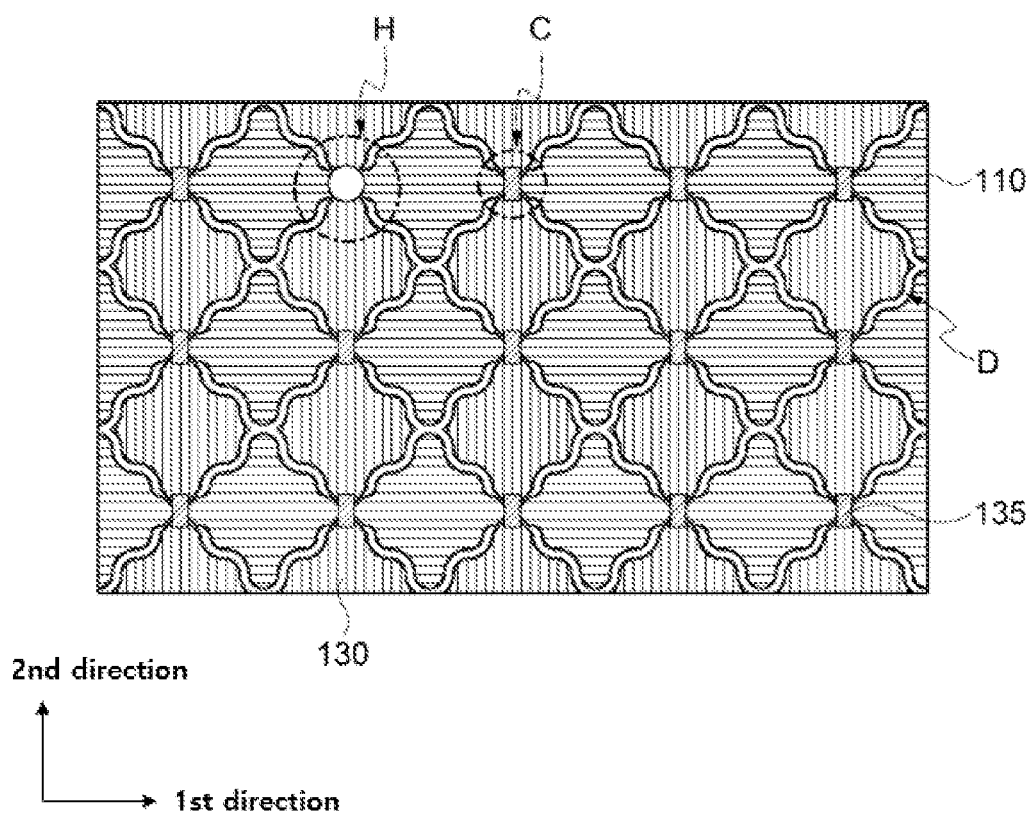
FIGS. 1 and 2 are a schematic top planar view and a schematic cross-sectional view, respectively, illustrating a touch sensor in accordance with exemplary embodiments.
Figure 2:
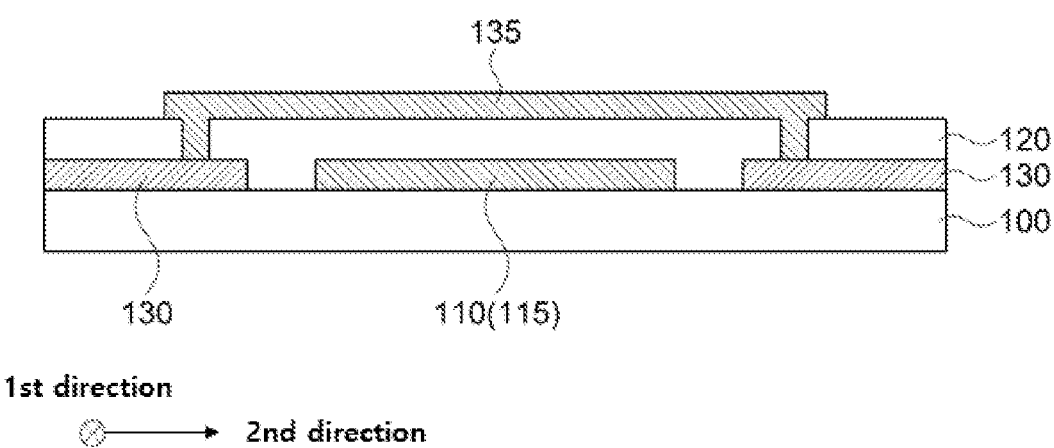

FIGS. 1 and 2 are a schematic top planar view and a schematic cross-sectional view, respectively, illustrating a touch sensor in accordance with exemplary embodiments. For example, FIG. 2 is a partially enlarged cross-section view of a region designated as "C" in FIG. 1.

Referring to FIGS. 1 and 2, a touch sensor may include a substrate layer 100 and sensing electrodes 110 and 130 arranged on the substrate layer 100.

The substrate layer 100 may include a film-type substrate that may serve as a base layer for forming the sensing electrodes 110 and 130, or an object or a workpiece on which the sensing electrodes 110 and 130 are formed. In some embodiments, the substrate layer 100 may include a display panel on which the sensing electrodes 110 and 130 may be directly formed.

For example, the substrate layer 100 may include a substrate or a film material commonly used in the touch sensor, e.g., glass, polymer and/or an inorganic insulation material. The polymer may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc. The inorganic insulation material may include, e.g., silicon oxide, silicon nitride, silicon oxynitride, a metal oxide, etc.

The sensing electrodes 110 and 130 may include first sensing electrodes 110 and second sensing electrodes 130.

For example, the first sensing electrodes 110 may be arranged along a first direction (e.g., an X-axis direction) parallel to a top surface of the substrate layer 100. Accordingly, a first sensing electrode row extending in the first direction may be formed by the first sensing electrodes 110. A plurality of the first sensing electrode rows may be arranged along a second direction.

In some embodiments, the first sensing electrodes 110 neighboring in the first direction may be physically or electrically connected to each other by a connecting portion 115. For example, the connecting portion 115 may be integrally formed with the first sensing electrodes 110 at the same level.

The second sensing electrodes 130 may be arranged along the second direction (e.g., a Y-axis direction) that may be parallel to a top surface of the substrate layer 100. In some embodiments, the second sensing electrodes 130 may include island-type unit electrodes physically separated from each other. In this case, the second sensing electrodes 130 neighboring in the second direction may be electrically connected to each other by a bridge electrode 135.

Accordingly, a second sensing electrode column extending in the second direction may be formed by a plurality of the second sensing electrodes 130 and the bridge electrodes 135. Further, a plurality of the second sensing electrode columns may be arranged along the first direction.

According to example embodiments, an insulating layer 120 may be formed on the substrate layer 100 to cover the first and second sensing electrodes 110 and 130. The bridge electrode 135 may be formed on the insulating layer 120 to penetrate through the insulating layer 120 and electrically connect the adjacent second sensing electrodes 130 to each other.

The insulating layer 120 may include an inorganic insulating material such as silicon oxide or silicon nitride, or an organic insulating material such as an acrylic resin or a siloxane resin.

For example, the first direction and the second direction may be parallel to the top surface of the substrate layer 100 and may be perpendicular to each other.

In some embodiments, periphery or boundary portions of the first sensing electrode 110 and the second sensing electrode 130 may be patterned in a wavy shape. Accordingly, a moire phenomenon caused by a regular overlap between the sensing electrodes 110 and 130 and electrodes or wirings (a data line, a gate line, etc.) included in a display panel disposed under the touch sensor may be reduced.

In some embodiments, the periphery or boundary of the first sensing electrode 110 and the second sensing electrode 130 may be patterned in a sawtooth shape, a diamond shape or a polygonal shape, etc.

The sensing electrodes 110 and 130 and/or the bridge electrode 135 may include a transparent conductive oxide such as, e.g., indium tin oxide (ITO), indium zinc oxide (IZO), zinc oxide (ZnO), indium zinc tin oxide (IZTO), cadmium tin oxide (CTO), etc.

For example, the sensing electrodes 110 and 130, and/or the bridge electrode 135 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy containing at least one of the metals (e.g., silver-palladium-copper (APC), copper-calcium (CuCa)). These may be used alone or in a combination thereof.

In some embodiments, the sensing electrodes 110 and 130, and/or the bridge electrode 135 may include a multi-layered structure including a transparent conductive oxide layer and a metal layer. For example, the sensing electrodes 110 and 130, and/or the bridge electrode 135 may have a double-layered structure including a transparent conductive oxide layer-a metal layer, or a triple-layered structure including a transparent conductive oxide layer-a metal layer-a transparent conductive oxide layer. In this case, a flexible property may be enhanced by the metal layer, and a resistance may be reduced to increase a signal transfer speed. Further, an anti-corrosion property and a transmittance may be improved by the transparent conductive oxide layer.

In a preferable embodiment, the sensing electrodes 110 and 130 may include the above-described transparent conductive oxide. Accordingly, an overall transmittance of the touch sensor may be improved, and image property of the image display device into which the touch sensor is inserted may be enhanced.

A dummy region D may be defined between the adjacent first and second sensing electrodes 110 and 130. The first sensing electrode 110 and the second sensing electrode 130 may be physically and electrically separated from each other by the dummy region D. Although not illustrated, a dummy electrode may be formed in the dummy region D. A visual recognition of electrodes due to deviations of pattern shapes and optical properties in the dummy region D may be prevented or reduced by the dummy electrode.

An intersection region C may be defined by an area where the first sensing electrode row and the second sensing electrode column cross each other or by an area where the connection portion 115 and the bridge electrode 135 may cross each other. According to exemplary embodiments, at least one of the intersection regions may be formed as a hole region H. The hole region H may include the device hole 150. As the device hole 150 is formed, the connection portion 115 and the bridge electrode 135 may be omitted or removed in the hole region H.

The term "device hole" used in the present application may encompass an opening at which a conductive layer is removed or is not selectively formed. The "device hole" may substantially encompass a vacant area and also encompass a structure where, e.g., a transparent insulating layer is at least partially formed in the opening. Structure and shape of the device hole 150 will be described later in more detail with reference to FIGS. 3 and 4.

Figure 3:
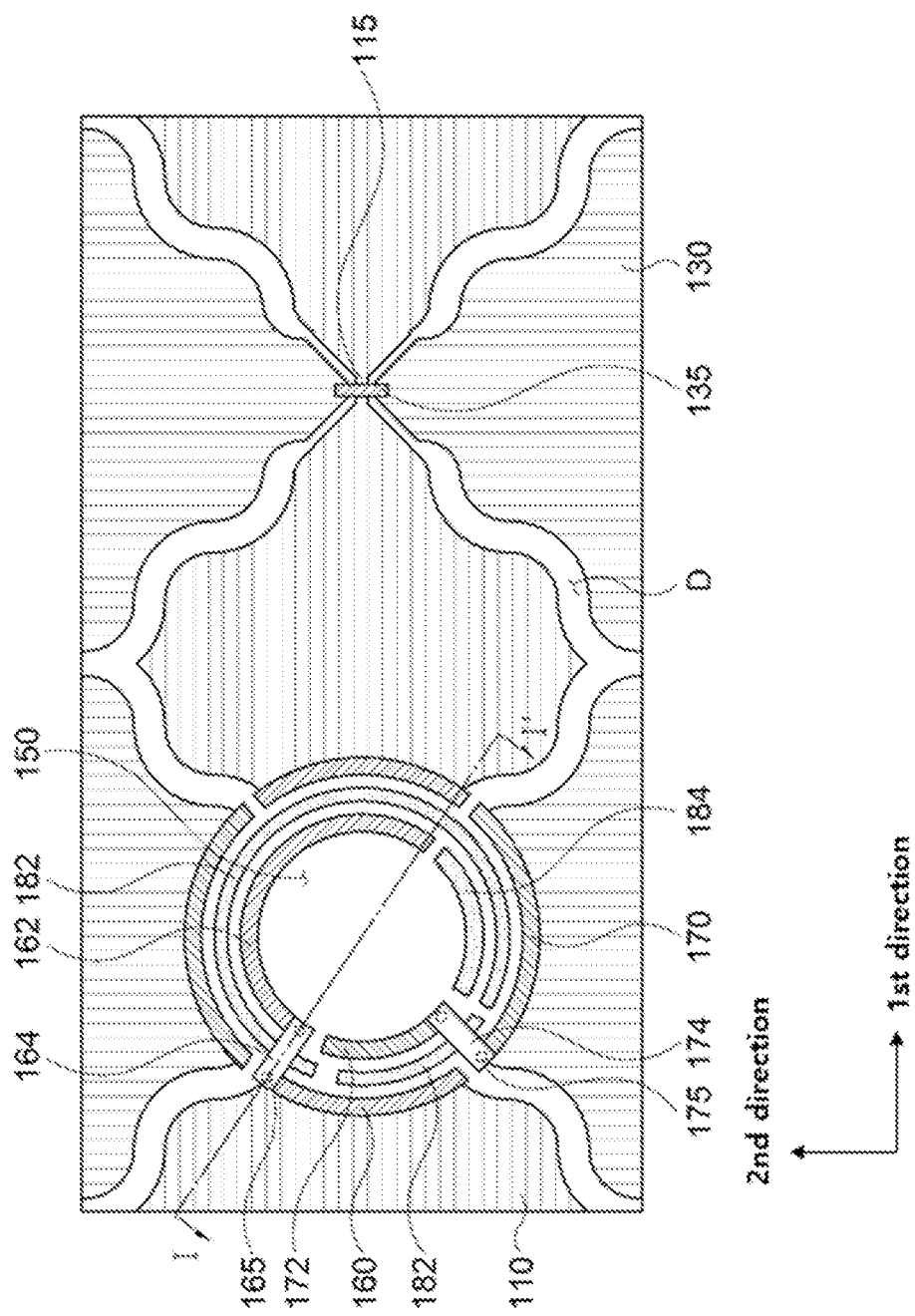
FIGS. 3 and 4 are a schematic top planar view and a schematic cross-sectional view, respectively, illustrating a construction of a device hole included in a touch sensor in accordance with exemplary embodiments.
Figure 4:
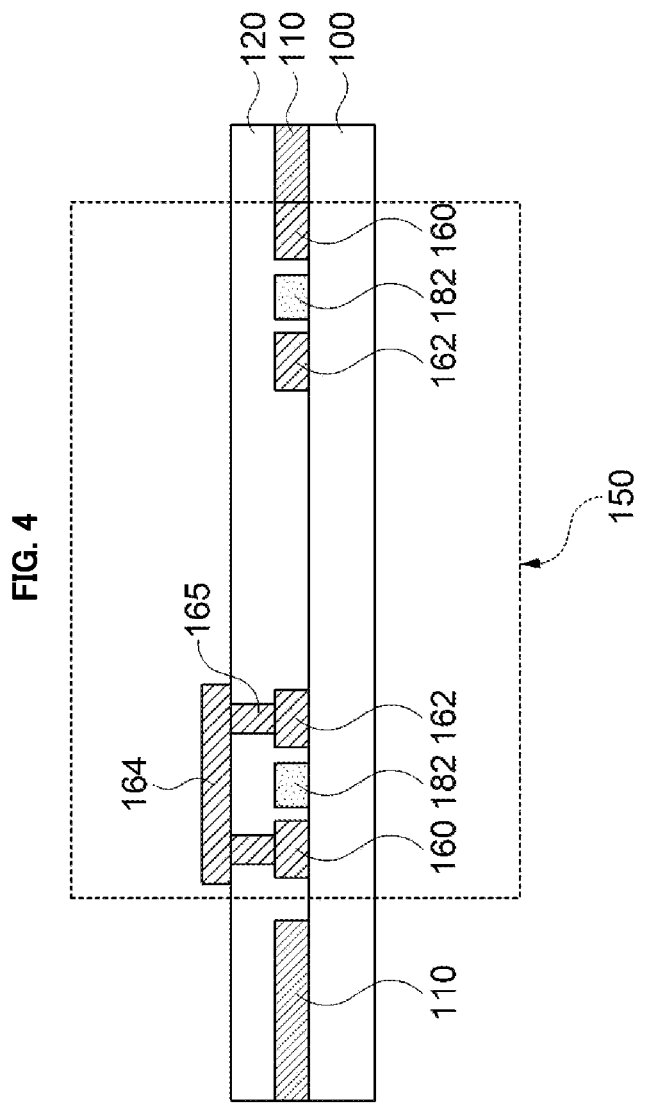

FIGS. 3 and 4 are a schematic top planar view and a schematic cross-sectional view, respectively, illustrating a construction of a device hole included in a touch sensor in accordance with exemplary embodiments. Specifically, FIG. 4 is a cross-sectional view taken along a line I-I' of FIG. 3 in a thickness direction.

FIGS. 3 and 4, the device hole 150 may be formed through at least one sensing electrode 110 and 130. As described above, at least one of the intersection regions C of the first sensing electrode row and the second sensing electrode column may be provided as the hole region H at which the device hole 150 is formed.

In some embodiments, the device hole 150 may penetrate through a pair of the first sensing electrodes 110 and a pair of the second sensing electrodes 130 adjacent to each other around the hole region H.

In exemplary embodiments, barrier wall patterns 160 and 170 defining a boundary of the device hole 150 may be formed along a periphery of the device hole 150. The barrier wall patterns 160 and 170 may contact sidewalls of the sensing electrodes 110 and 130.

The barrier wall pattern may include a first barrier wall pattern 160 in contact with a sidewall of the first sensing electrode 110 and a second barrier wall pattern 170 in contact with a sidewall of the second sensing electrode 130. The first barrier wall pattern 160 and the second barrier wall pattern 170 may be electrically and physically separated from each other.

As illustrated in FIG. 3, when the device hole 150 has a substantially circular shape, the barrier wall pattern may be formed along a circumference, and may have a ring pattern shape that may be cut such that the first barrier wall pattern 160 and the second barrier wall pattern 170 may be spaced apart from each other. The boundary of the device hole 150 may be substantially defined by the barrier wall pattern.

The shape of the device hole 150 may be appropriately changed into a polygonal shape, an elliptical shape, etc., according to a shape of a corresponding functional device An extension pattern may be formed at an inside the device hole 150. The extension pattern may be electrically connected to the barrier wall pattern, and may be disposed at the inside the device hole 150 to be closer to a center of the device hole 150 than the barrier wall pattern.

The extension pattern may include a first extension pattern 162 connected to the first barrier wall pattern 160 and a second extension pattern 172 connected to the second barrier wall pattern 170. The first extension pattern 162 and the second extension pattern 172 may be electrically and physically separated from each other in the device hole 150.

For example, the extension patterns may be formed along a profile around the device hole 150 and may have, e.g., a circular arc shape.

In exemplary embodiments, a dummy pattern may be further formed in the device hole 150. The dummy pattern may include a first dummy pattern 182 formed between the barrier wall patterns 160 and 170 and the extension patterns 162 and 172, and a second dummy pattern 184 formed between the first extension pattern 162 and the second extension pattern 172.

The dummy pattern may be also formed along a profile around the device hole 150 and may be a circular arc-shaped pattern.

In an embodiment, the barrier wall patterns 160 and 170, the first dummy pattern 182, and the extension patterns 162 and 172 may be formed along circular arcs whose radii may be sequentially reduced.

In exemplary embodiments, the first dummy pattern 182 may be disposed between the first barrier wall pattern 160 and the first extension pattern 162. Accordingly, a first bridge pattern 164 may be formed to connect the first barrier wall pattern 160 and the first extension pattern 162 to each other. The first bridge pattern 164 may be disposed on the insulating layer 120 and may cross the first dummy pattern 182 in a planar view.

The first bridge pattern 164 may connect the first barrier wall pattern 160 and the first extension pattern 162 to each other through a first contact 165. For example, the first contact 165 may penetrate through the insulating layer 120 and may contact the first barrier wall pattern 160 and the first extension pattern 162.

The first dummy pattern 182 may also be disposed between the second barrier wall pattern 170 and the second extension pattern 172. Accordingly, a second bridge pattern 174 may be formed to connect the second barrier wall pattern 170 and the second extension pattern 172 to each other. The second bridge pattern 174 may be disposed on the insulating layer 120 and may cross the first dummy pattern 182 in a planar view.

The second bridge pattern 174 may connect the second barrier wall pattern 170 and the second extension pattern 172 to each other through a second contact 175. For example, the second contact 175 may penetrate through the insulating layer 120 and may contact the second barrier wall pattern 170 and the second extension pattern 172.

In some embodiments, the first and second bridge patterns 164 and 174 may be disposed at the same level or at the same layer as that of the bridge electrode 135, and may be formed together by substantially the same etching process. For example, the first and second bridge patterns 164 and 174 and the bridge electrode 135 may include the same metal or alloy.

The second dummy pattern 184 may be closer to the center of the device hole 150 than the first dummy pattern 182. In exemplary embodiments, the second dummy pattern 184 may be formed along substantially the same circumference as that of the first and second extension patterns 162 and 172. The second dummy pattern 184 may be disposed between the first extension pattern 162 and the second extended pattern 172.

The device hole 150 may be formed to correspond to a functional device of an image display device such as a camera, a speaker, a recorder, an optical sensor, a light, etc. For example, when the touch sensor is inserted into the image display device, the device hole 150 may be aligned so as to overlap a position where the functional device is located.

For example, the device hole 150 may be formed in an area of the touch sensor overlapping the camera, so that a transmittance substantially close to 100% may be realized, thereby improving a resolution and a imaging quality of the camera. Further, optical and electrical interference caused by the sensing electrodes 110 and 130 included in the touch sensor may be substantially avoided, so that a desired performance of the functional device may be realized with high reliability in the image display device.

When an external static electricity is applied to the touch sensor including the device hole 150, the external static electricity may be trapped in the device hole 150 and a charging due to the static electricity may occur in the device hole 150.

In this case, a physical damage or an electrical short-circuit may occur in the sensing electrodes 110 and 130 adjacent to the device hole 150. Accordingly, electrical and mechanical durability of the touch sensor may be deteriorated.

However, according to the above-described exemplary embodiments, the barrier wall patterns 160 and 170 may be formed around the device hole 150 to effectively absorb the external static electricity. Additionally, the extension patterns 162 and 172 connected to the barrier wall patterns 160 and 170 may be formed in the device hole 150, so that a mobility of the external static electricity may be promoted.

Thus, the charging phenomenon due to the external static electricity in the device hole 150 may be prevented, and electrical and mechanical durability of the sensing electrodes 110 and 130 around the device hole 150 may be improved.

Additionally, for example, the first dummy pattern 182 may be disposed between the first barrier wall pattern 160 and the second extension pattern 172, and between the second barrier wall pattern 170 and the first extension pattern 162. The second dummy pattern 184 may be disposed between the first and second extension patterns 162 and 172.

Accordingly, a flow of the external static electricity in the device hole 150 may be promoted while maintaining operation reliability or independence between the first sensing electrode 110 and the second sensing electrode 130.

In some embodiments, the barrier wall patterns 160 and 170, the dummy patterns 182 and 184 and the extension patterns 162 and 172 may be patterns formed of the above-described metal or alloy, thereby having a relatively low resistance compared that of the sensing electrodes 110 and 130. Thus, a removal of the external static electricity may be further promoted.

Figure 5:
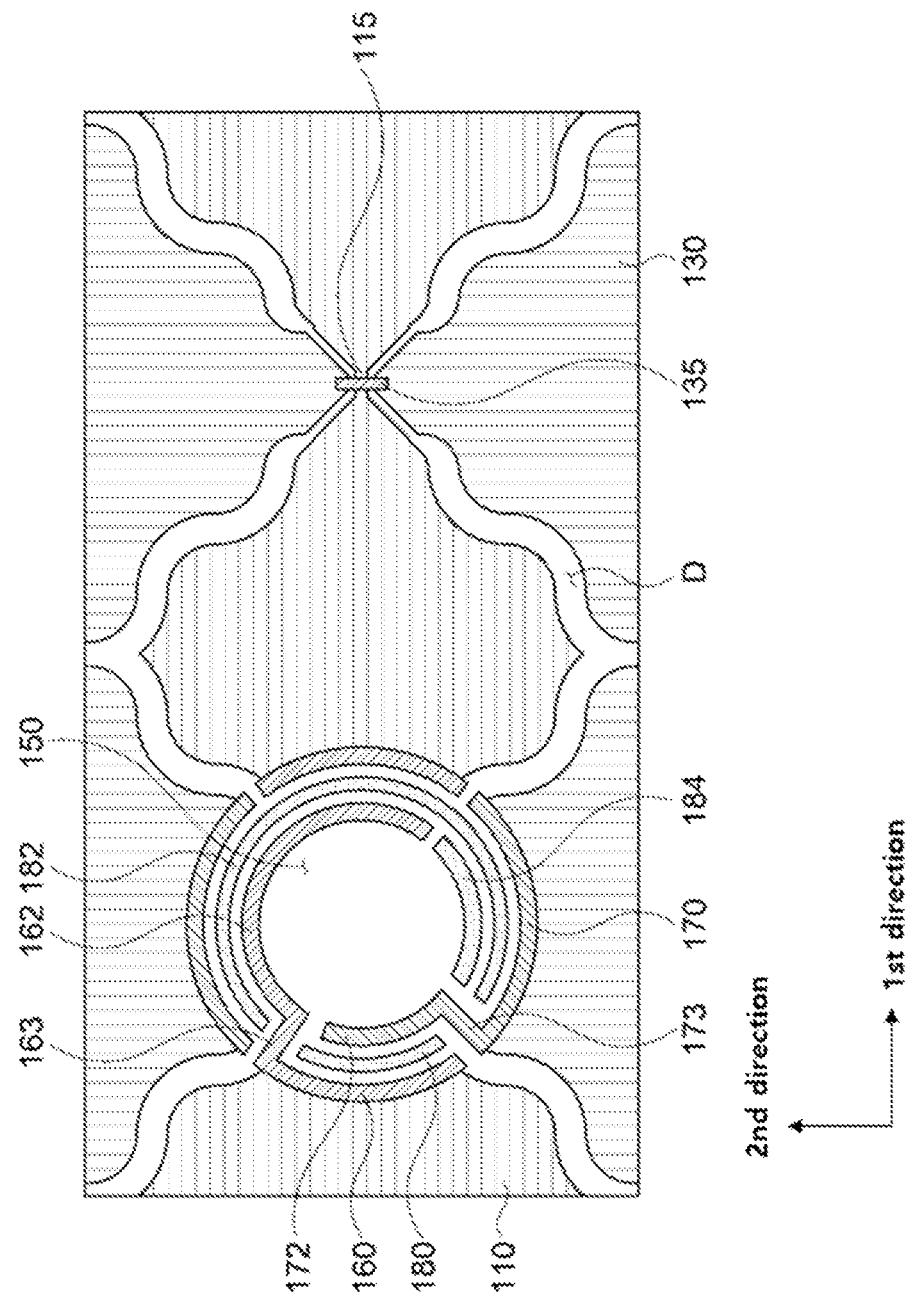
FIG. 5 is a schematic top planar view illustrating a construction of a device hole included in a touch sensor in accordance with exemplary embodiments.

FIG. 5 is a schematic top planar view illustrating a construction of a device hole included in a touch sensor in accordance with exemplary embodiments.

Referring to FIG. 5, the barrier wall pattern and the extension pattern may be formed as a single member integrally connected to each other.

As illustrated in FIG. 5, the first barrier wall pattern 160 and the first extension pattern 162 may be integrally connected to each other via a first connection pattern 163. The first barrier wall pattern 160, the first connection pattern 163 and the first extension pattern 162 may all be disposed at the same level or at the same layer. Accordingly, the first bridge pattern 164 and the first contact 165 illustrated in FIG. 3 may be omitted.

The second barrier wall pattern 170 and the second extension pattern 172 may be integrally connected to each other via a second connection pattern 173. The second barrier wall pattern 170, the second connection pattern 173 and the second extension pattern 172 may all be disposed at the same level or at the same layer. Accordingly, the second bridge pattern 174 and the first contact 165 illustrated in FIG. 3 may be omitted.

The first dummy pattern 182 may have a segmented shape so as not to contact the first and second connection patterns 163 and 173. Accordingly, as described above, the bridge patterns 164 and 174 may be omitted and conductive patterns included in the device hole 150 may be constructed in a substantially single layer.

FIG. 6 is a schematic cross-sectional view illustrating an image display device in accordance with exemplary embodiments.

Referring to FIG. 6, the image display device may include a base substrate 200, a display structure 210, a touch sensor 220, a polarizing plate 230, and a window substrate 240. A display panel may be defined by the base substrate 200 and the display structure 210.

Additionally, a window stack structure may be defined by the touch sensor 220, the polarizing plate 230 and the window substrate 240.

The base substrate 200 may serve as, e.g., a back-plane substrate of the image display device, and may include a transparent insulating material such as glass or polyimide.

The display structure 210 may include a thin film transistor (TFT) arranged on the base substrate 200, a pixel electrode electrically connected to the thin film transistor and a display layer formed on the pixel electrode. The display layer may include, e.g., a liquid crystal layer or an organic emission layer. The display structure 210 may further include wirings such as a data line, a power line, a scan line, etc., electrically connected to the thin film transistor. Further, a functional device such as a camera, a speaker, an optical sensor, a recorder, a light, etc., may be included in the display structure 210.

The touch sensor 220 may be stacked on the display structure 210. As described above, the touch sensor 220 may include the device hole 150, and the device hole 150 may be aligned to be substantially superimposed over the functional device.

The polarizing plate 230 may be stacked on the touch sensor 220. In some embodiments, the polarizing plate 230 may also include a hole 235 overlaying the functional device. The hole 235 may be formed by cutting a partial region of the polarizing plate 230 or through a local depolarization process. The device hole 150 and the hole 235 may be aligned to be superimposed on each other.

In some embodiments, the polarizing plate 230 may be stacked on the display structure 210, and then the touch sensor 220 may be stacked on the polarizing plate 230.

The window substrate 240 may be stacked on the polarizing plate 230 or the touch sensor 220 and may serve as a protective film or a protective substrate of the image display device. The window substrate 240 may include, e.g., a transparent insulating resin such as polyester, polyurethane, polyacrylate, or the like, or glass such as ultra-thin glass (UTG).

What is claimed is:

1. A touch sensor, comprising:
    a substrate layer;
    sensing electrodes formed on the substrate layer, the sensing electrodes comprising first sensing electrodes arranged in a first direction parallel to a top surface of the substrate layer and second sensing electrodes arranged along a second direction parallel to the top surface of the substrate layer, the first direction and the second direction intersecting each other;
    at least one device hole penetrating through at least one of the sensing electrodes;
    a barrier wall pattern formed along a periphery of the device hole, the barrier wall pattern comprising a first barrier wall pattern in contact with a first sensing electrode around the device hole of the first sensing electrodes, and a second barrier wall pattern in contact with a second sensing electrode around the device hole of the second sensing electrodes;
    an extension pattern disposed in the device hole to be connected to the barrier wall pattern, the extension pattern comprising a first extension pattern connected to the first barrier wall pattern, and a second extension pattern connected to the second barrier wall pattern; and
    a first dummy pattern extending between the first barrier wall pattern and the second extension pattern or between the second barrier wall pattern and the first extension pattern,
    wherein the first barrier wall pattern comprises a pair of first barrier patterns facing each other with the device hole interposed therebetween, and the pair of first barrier patterns are electrically separated from each other; and
    the second barrier wall pattern comprises a pair of second barrier patterns facing each other with the device hole interposed therebetween, and the pair of second barrier patterns are electrically separated from each other.

2. The touch sensor according to claim 1, further comprising:
    connecting portions integrally formed with first sensing electrodes neighboring in the first direction of the first sensing electrodes to form first sensing electrode rows extending in the first direction; and
    bridge electrodes electrically connecting second sensing electrodes neighboring in the second direction of the second sensing electrodes to form second sensing electrode columns extending in the second direction.

3. The touch sensor according to claim 2, wherein the device hole is formed in at least one of intersection regions of the first sensing electrode rows and the second sensing electrode columns.

4. The touch sensor according to claim 3, wherein the device hole penetrates through a pair of first sensing electrodes adjacent to each other of the first sensing electrodes and a pair of second sensing electrodes adjacent to each other of the second sensing electrodes.

5. The touch sensor according to claim 1, further comprising:
    a first bridge pattern electrically connecting the first barrier wall pattern and the first extension pattern; and
    a second bridge pattern electrically connecting the second barrier wall pattern and the second extension pattern.

6. The touch sensor according to claim 5, wherein the first bridge pattern and the second bridge pattern intersect the first dummy pattern in a planar view.

7. The touch sensor according to claim 1, further comprising:
- a first connection pattern integrally connecting the first barrier wall pattern and the first extension pattern to each other at the same level; and
- a second connection pattern integrally connecting the second barrier wall pattern and the second extension pattern to each other at the same level.

8. The touch sensor according to claim 7, wherein the first dummy pattern has a shape cut by the first connection pattern or the second connection pattern.

9. The touch sensor according to claim 1, further comprising a second dummy pattern extending between the first extension pattern and the second extension pattern.

10. The touch sensor according to claim 9, wherein the first extension pattern, the second extension pattern and the second dummy pattern are arranged along the same circumference.

11. The touch sensor according to claim 1, wherein the sensing electrodes include a transparent conductive oxide, and the barrier wall pattern and the extension pattern include a metal or an alloy.

12. A window stack structure, comprising:
- a window substrate; and
- the touch sensor according to claim 1.

13. The window stack structure according to claim 12, further comprising a polarizing plate disposed between the touch sensor and the window substrate or on the touch sensor.

14. An image display device, comprising:
- a display structure including at least one functional device selected from the group consisting of a camera, a speaker, an optical sensor, a recorder and a light; and
- the touch sensor according to claim 1 stacked on the display structure.

15. The image display device according to claim 14, wherein the device hole of the touch sensor is aligned to be superimposed over the functional device.

* * * * *